US006433066B2

(12) United States Patent
Kirino et al.

(10) Patent No.: US 6,433,066 B2
(45) Date of Patent: Aug. 13, 2002

(54) RUBBER COMPOSITION

(75) Inventors: Yoshiaki Kirino; Fumito Yatsuyanagi, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/828,912

(22) Filed: Apr. 10, 2001

(30) Foreign Application Priority Data

Apr. 11, 2000 (JP) ........................................ 2000-115813

(51) Int. Cl.⁷ ................................................. C08K 3/34
(52) U.S. Cl. ....................................................... 524/492
(58) Field of Search ......................................... 524/492

(56) References Cited

U.S. PATENT DOCUMENTS 5,852,099 A    12/1998    Vanel

*Primary Examiner*—Paul R. Michl
(74) *Attorney, Agent, or Firm*—Arent Fox Kintner Plotkin & Kahn, PLLC

(57) ABSTRACT

A rubber composition superior in dispersion and abrasion resistance, containing precipitated silica having an aluminum content of 0.01 to 0.24 wt %.

5 Claims, No Drawings

RUBBER COMPOSITION

BACKGROUND OF THE INVENTION

1. Field of the Invention

The present invention relates to a silica-formulation based rubber composition designed to improve the processability and abrasion resistance.

2. Description of the Related Art

The technique of using aluminum-doped precipitated silica having a content of aluminum in the precipitated silica of 0.35 to 3 wt % by weight of silica as a reinforcing filler of a rubber composition for tire manufacture based on at least one type of diene-based polymer so as to improve the workability of a tire use diene-based rubber and reduce the amount of coupling agent used without causing deterioration of the properties of the composition is disclosed in Japanese Unexamined Patent Publication (Kokai) No. 8-277346, Japanese National Publication (Tokuhyo) No. 10-503748, and Japanese National Publication (Tokuhyo) No. 10-504012.

The precipitated silica generally being used as a reinforcing filler for rubber contains a slight amount of aluminum, but when the content of aluminum exceeds 0.24%, the inclusion in the rubber is poor and the Mooney viscosity becomes high, so the processability of the rubber composition formulated with this silica reinforcing filler is poor.

SUMMARY OF THE INVENTION

An object of the present invention is to achieve a reduction in the Mooney viscosity and an improvement in the abrasion resistance by blending a precipitated silica reduced in aluminum content into the rubber.

According to the present invention, there is provided a rubber composition containing precipitated silica having an aluminum content of 0.01 to 0.24 wt %. More preferably, there is provided a rubber composition containing precipitated silica having an aluminum content of 0.01 to 0.1 wt %.

Further, according to the present invention, there is provided a rubber composition containing precipitated silica having an aluminum content of 0.01 to 0.24 wt %, more preferably, 0.01 to 0.1 wt %, and having a CTAB specific area of 130 to 210 $m^2/g$ and a BET/CTAB ratio of 1.3 to 2.0

Further, according to the present invention, there is provided a rubber composition having, as a rubber ingredient, natural rubber, a diene-based synthetic rubber, or a mixture of these rubbers and having, in addition to the precipitated silica, carbon black in an amount of at least 10 parts by weight with respect to 100 parts by weight of the rubber ingredient.

DESCRIPTION OF THE PREFERRED EMBODIMENTS

According to the present invention, it was discovered that, as the content of aluminum in the precipitated silica used as the reinforcing filler of the rubber composition is reduced, when the content falls below a certain amount, the inclusion of the silica in the rubber is improved and the Mooney viscosity falls, that is, the processability of the rubber composition is improved, and the abrasion resistance is improved.

According to the above discovery of the present invention, good results are obtained when the content of the aluminum in the precipitated silica is from 0.01 to 0.24 wt %. If the content of the aluminum is more than 0.24 wt %, the inclusion of the silica in the rubber becomes poor and the Mooney viscosity rises. Further, if the content of the aluminum is made 0.01 to 0.1 wt %, even better results are obtained in the above properties.

Further, the precipitated silica of the present invention, to secure reinforcement of the rubber, is preferably selected from ones having a CTAB specific area of the silica of 130 to 210 $m^2/g$ and a BET/CTAB ratio of 1.3 to 2.0. If the CTAB specific area is less than 130 $m^2/g$ and the BET/CTAB ratio is less than 1.3, securing the reinforcement becomes difficult. Further, if the CTAB specific area is over 210 $m^2/g$ and the BET/CTAB ratio is over 2.0, the preparation of the precipitated silica itself becomes difficult, the cost is increased, and the dispersion becomes poor.

The rubber ingredient used in the rubber composition of the present invention may be selected from natural rubber (NR) and a diene-based synthetic rubber such as polyisoprene rubber (IR), various types of styrene-butadiene copolymer rubbers (SBR), various types of polybutadiene rubbers (BR), an acrylonitrile-butadiene copolymer rubber (NBR), butyl rubber (IIR), etc. These may be used alone or in mixtures of two or more types. When using a mixture of two or more types of natural rubber and diene-based synthetic rubbers, a rubber mixture containing at least 60 parts by weight of natural rubber is preferable in terms of the object of the present invention.

The rubber composition of the present invention may further contain, in addition to the precipitated silica of the present invention, a usual carbon black in order to improve the electrical conductivity and abrasion resistance. This is added in an amount of at least 10 parts by weight, preferably 10 to 80 parts by weight, with respect to 100 parts by weight of the rubber ingredient. If the amount of the carbon black added is under 10 wt %, the effects are low, while if over 80 wt %, there is a problem of deterioration in the heat build-up of the rubber composition, and thus the proper ability of the silica can hardly be brought out.

The rubber composition of the present invention may further contain a silane coupling agent as desired. As the silane coupling agent, any silane coupling agent used for rubber compositions in the past may be used in the ordinary amounts of use.

The rubber composition of the present invention may contain, in addition to the above ingredients, a vulcanization or cross-linking agent, vulcanization or cross-linking accelerator, various types of oils, an antiaging agent, a plasticizer, and various other types of compounding agents used for tires and other general rubber products. The formulation may be kneaded and vulcanized to make a rubber composition by a general method and used for vulcanization or cross-linking. The amounts of the additives used may be made general amounts as in the past so far as not running counter to the object of the present invention.

Below, the present invention will be explained further with reference to examples and comparative examples, but the technical scope of the present invention is of course not limited to these examples.

Preparation of Test Samples

Using the precipitated silica of the types shown in the following Table 2, the ingredients of each of the rubber formulations shown in the following Table 1 other than the vulcanization accelerator and the sulfur were kneaded by a 1.8 liter closed mixer for 3 to 5 minutes and discharged when reaching 165±5° C. The vulcanization agent and sulfur were then added to this master batch and the mixture kneaded by an 8-inch open roll to obtain a rubber composition. The Mooney viscosity of the obtained rubber composition was measured.

Next, the composition was vulcanized by pressing in a 15×15×0.2 cm mold at 160° C. for 20 minutes to prepare the desired test piece (rubber sheet). This was used for measurement and evaluation of the dispersion, abrasion resistance, and tan δ (60° C.).

TABLE 1

Rubber Formulation

|  | Formulation 1 | Formulation 2 | Formulation 3 | Formulation 4 |
|---|---|---|---|---|
| Natural rubber 1) | 100 |  | 60 | 50 |
| Oil extended SBR 2) |  | 137.5 |  |  |
| SBR 3) |  |  | 40 | 50 |
| Silica | 50 | 80 | 20 | 20 |
| Carbon black 4) |  |  | 30 | 30 |
| Silane coupling agent 5) | 5 | 8 | 5 | 5 |
| Zinc white 6) | 5 | 3 | 3 | 3 |
| Stearic acid 7) | 3 | 1 | 1 | 1 |
| Vulcanization accelerator 8) | 1 | 1 | 1 | 1 |
| Sulfur 9) | 2 | 2 | 2 | 2 |

Notes:
1) RSS#3
2) 37.5% oil extended emulsion polymerized styrene/butadiene rubber, SBR 1712 (made by Nippon Zeon)
3) Nipol 1502 (made by Nippon Zeon)
4) N339 (made by Showa Cabot)
5) Si 69 (made by Degussa)
6) Zinc white no. 3, industrial use zinc oxide
7) Stearic acid, industrial use stearic acid
8) Noccelar CZ (N-cyclohexyl-2-benzothiazylsulfenamide, made by Ouchi Shinko Chemical)
9) 5% oil extended powdered sulfur (made by Karuizawa Refineries)

TABLE 2

Type of Silica

|  | A-1 | A-2 | A-3 | A-4 | A-5 | A-6 |
|---|---|---|---|---|---|---|
| Al content (wt %) | 0.01 | 0.02 | 0.1 | 0.24 | 0.1 | 0.1 |
| BET/CTAB | 1.60 | 1.50 | 1.60 | 1.70 | 2.00 | 1.30 |
| BET (m²/g) | 240 | 222 | 235 | 253 | 260 | 274 |
| CTAB (m²/g) | 150 | 148 | 147 | 149 | 130 | 210 |

TABLE 2-continued

Type of Silica

|  | A-7 | A-8 | A-9 | A-10 | A-11 |
|---|---|---|---|---|---|
| Al content (wt %) | 0.02 | 0.1 | 0.1 | 0.6 | 0.6 |
| BET/CTAB | 1.10 | 2.15 | 1.30 | 1.59 | 1.10 |
| BET (m²/g) | 163 | 280 | 285 | 236 | 163 |
| CTAB (m²/g) | 148 | 130 | 220 | 148 | 148 |

Test Methods

1) Mooney viscosity: Measured at 100° C. based on JIS K6300.

2) Dispersion: Dispersion state of the silica on the surface of vulcanized rubber cut with a sharp blade observed with unaided eyes and a microscope(×100, 400), and evaluated by the following standard:

VG (very good): Almost no poorly dispersed clumps of silica (several hundred microns in diameter) and even dispersion G (good): A few poorly dispersed clumps of silica found, but otherwise dispersed to a certain extent F (fair): Several dozen poorly dispersed clumps of silica seen, but otherwise dispersed to a certain extent P (poor): Powdery like substance confirmed to be visible from cut surface and innumerable poorly dispersed clumps of silica observed 3) Abrasion resistance: Abrasion loss measured using Lambourne abrasion tester (made by Iwamoto Seisakusho) under conditions of a temperature of 20° C. and a slip rate of 25% and expressed indexed to values of Comparative Examples 2, 4, and 6 as 100. The larger the values, the better the abrasion resistance indicated.

4) tan δ (60° C.): Viscoelasticity measured using Toyo Seiki Seisakusho Rheograph Solid at initial strain of 10%, dynamic strain of 2%, and frequency of 20 Hz.

EXAMPLES 1 to 20 and Comparative Examples 1 to 6

These examples show results of measurement and evaluation of rubber compositions of various rubber formulations containing precipitated silica of various types of silica. The results are shown in Table 3.

TABLE 3

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|
| Rubber formulation | 1 | 1 | 1 | 1 | 1 | 1 | 1 | 1 | 1 | 1 | 1 |
| Type of silica | A-1 | A-2 | A-3 | A-4 | A-5 | A-6 | A-7 | A-8 | A-9 | A-10 | A-11 |
| Mooney viscosity | 79 | 80 | 82 | 83 | 72 | 105 | 79 | 74 | 109 | 88 | 88 |
| Dispersion | VG | VG | VG | G | VG | VG | VG | G | F | P | P |
| Abrasion resistance (index) | 110 | 110 | 108 | 106 | 103 | 105 | 102 | 100 | 101 | 105 | 100 |
| tan δ (60° C.) | 0.146 | 0.146 | 0.148 | 0.15 | 0.15 | 0.175 | 0.143 | 0.153 | 0.18 | 0.15 | 0.147 |

|  | Ex. 10 | Ex. 11 | Ex. 12 | Ex. 13 | Ex. 14 | Ex. 15 | Ex. 16 | Ex. 17 | Ex. 18 | Comp. Ex. 3 | Comp. Ex. 4 |
|---|---|---|---|---|---|---|---|---|---|---|---|
| Rubber formulation | 2 | 2 | 2 | 2 | 2 | 2 | 2 | 2 | 2 | 2 | 2 |
| Type of silica | A-1 | A-2 | A-3 | A-4 | A-5 | A-6 | A-7 | A-8 | A-9 | A-10 | A-11 |
| Mooney viscosity | 70 | 71 | 73 | 74 | 63 | 96 | 70 | 65 | 100 | 79 | 79 |
| Dispersion | G | G | G | F | G | G | G | F | F | P | P |
| Abrasion resistance | 108 | 108 | 106 | 104 | 104 | 104 | 102 | 99 | 100 | 104 | 100 |

TABLE 3-continued

| (index) | | | | | | | | | | | |
|---|---|---|---|---|---|---|---|---|---|---|---|
| tan δ (60° C.) | 0.153 | 0.153 | 0.155 | 0.157 | 0.159 | 0.17 | 0.15 | 0.161 | 0.175 | 0.157 | 0.154 |

| | Ex. 19 | Ex. 20 | Comp. Ex. 5 | Comp. Ex. 6 |
|---|---|---|---|---|
| Rubber formulation | 3 | 4 | 3 | 4 |
| Type of silica | A-2 | A-2 | A-10 | A-10 |
| Mooney viscosity | 56 | 52 | 62 | 58 |
| Dispersion | VG | G | P | P |
| Abrasion resistance (index) | 110 | 107 | 101 | 100 |
| tan δ (60° C.) | 0.252 | 0.255 | 0.256 | 0.259 |

Summarizing the effects of the present invention, as seen from the results of Table 3, it is found that rubber compositions containing the precipitated silica according to the present invention are extremely excellent in the desired dispersion and abrasion resistance.

That is, the rubber compositions of Examples 1 to 20 containing the precipitated silica according to the present invention (A-1 to A-9) are excellent in dispersion compared with Comparative Examples 1 to 6 containing precipitated silica with large aluminum contents (A-10 and A-11). Further, when compared with examples containing A-3 and A-7 having BET values and CTAB values corresponding to A-10 and A-11 (Examples 3, 7, 12, and 16), the examples of the present invention are better in abrasion resistance and resistance to heat buildup.

Further, from Examples 19 and 20 and Comparative Examples 5 and 6, it is found that the precipitated silica of the present invention is more preferably used in a system containing at least 60 parts of natural rubber in view of dispersion, abrasion resistance, and resistance to heat buildup.

While the invention has been described with reference to specific embodiment chosen for purpose of illustration, it should be apparent that numerous modifications could be made thereto by those skilled in the art without departing from the basic concept and scope of the invention.

What is claimed is:

1. A rubber composition containing precipitated silica having an aluminum content of 0.01 to 0.24 wt %.

2. A rubber composition containing precipitated silica having an aluminum content of 0.01 to 0.1 wt %.

3. A rubber composition as claimed in claim 1, wherein a CTAB specific area of the precipitated silica is 130 to 210 $m^2/g$ and a BET/CTAB ratio is 1.3 to 2.0.

4. A rubber composition as claimed in claim 1, wherein a rubber ingredient is said rubber composition is natural rubber, a diene-based synthetic rubber, or a mixture of these rubbers and carbon black is further contained in an amount of at least 10 parts by weight with respect to 100 parts by weight of the rubber ingredient.

5. A rubber composition as claimed in claim 1, wherein the rubber ingredient in said rubber composition is a rubber mixture containing at least 60 parts by weight of natural rubber.

* * * * *